United States Patent
Falk

(10) Patent No.: US 9,849,604 B2
(45) Date of Patent: Dec. 26, 2017

(54) ARRANGEMENT FOR ACHIEVING A RECIPROCAL MOTION IN PARTICULAR FOR A CHAIN SAW

(71) Applicant: TURNSET AB, Färila (SE)

(72) Inventor: Gunnar Kurt Falk, Hudiksvall (SE)

(73) Assignee: TURNSET AB, Farila (SE)

( * ) Notice: Subject to any disclaimer, the term of this patent is extended or adjusted under 35 U.S.C. 154(b) by 510 days.

(21) Appl. No.: 14/401,961

(22) PCT Filed: May 17, 2013

(86) PCT No.: PCT/SE2013/000081
§ 371 (c)(1),
(2) Date: Nov. 18, 2014

(87) PCT Pub. No.: WO2013/172761
PCT Pub. Date: Nov. 21, 2013

(65) Prior Publication Data
US 2015/0165639 A1     Jun. 18, 2015

(30) Foreign Application Priority Data
May 18, 2012   (SE) ...................................... 1200343

(51) Int. Cl.
*A01G 23/091*   (2006.01)
*B27B 17/08*    (2006.01)
(Continued)

(52) U.S. Cl.
CPC ............ *B27B 17/08* (2013.01); *A01G 23/091* (2013.01); *F01C 9/002* (2013.01); *F01C 13/02* (2013.01);
(Continued)

(58) Field of Classification Search
CPC .... A01G 23/08; A01G 23/083; A01G 23/091; B27B 17/08; B27B 17/083; B27B 17/086; B27B 17/10; B27B 17/12
(Continued)

(56) References Cited

U.S. PATENT DOCUMENTS 2,781,027 A    2/1957  Henry
3,696,713 A   10/1972  Ragard
(Continued)

FOREIGN PATENT DOCUMENTS

DE    197 25 412 A1    1/1999
EP    0 993 767 A2     4/2000
(Continued)

OTHER PUBLICATIONS

European Search Report, dated Apr. 25, 2016, from corresponding European Application No. 13790233.
(Continued)

*Primary Examiner* — Matthew G Katcoff
(74) *Attorney, Agent, or Firm* — Young & Thompson

(57) ABSTRACT

An arrangement that can be turned by an assigned hydraulic pressure and flow, related to a chain saw supported by a harvesting unit for crosscutting timber, wherein a bearing arrangement is arranged for the chain saw and oriented between a guide bar housing and the chain saw's drive motor unit, wherewith an oscillatory motion can be activated by a hydraulic control valve, through which hydraulic flow is alternatively controlled via feed or connection lines to the bearing arrangement, for a first or second operating mode. The arrangement is activated via hydrostatic pressure and coordinated with the guide bar housing, and with the drive motor unit, via surrounding perforated discs oriented in parallel and aligned around an axis of rotation for a drive shaft. The hydrostatic affects the arrangement's oscillatory (Continued)

motion for a reciprocal motion pattern, while spent hydraulic oil serves as a lubricating film between the opposing bearing surfaces.

19 Claims, 4 Drawing Sheets

(51) Int. Cl.
*F01C 9/00* (2006.01)
*F01C 13/02* (2006.01)
*F01C 21/00* (2006.01)
*F01C 21/10* (2006.01)
*F04C 9/00* (2006.01)
*F15B 15/12* (2006.01)
*F15B 21/12* (2006.01)
*F16C 33/66* (2006.01)
*F16C 32/06* (2006.01)

(52) U.S. Cl.
CPC .......... *F01C 21/007* (2013.01); *F01C 21/10* (2013.01); *F04C 9/002* (2013.01); *F15B 15/12* (2013.01); *F15B 21/12* (2013.01); *F04C 2240/54* (2013.01); *F16C 32/064* (2013.01); *F16C 33/6637* (2013.01); *Y10T 83/7145* (2015.04)

(58) Field of Classification Search
USPC .................................................. 83/743–745
See application file for complete search history.

(56) References Cited

U.S. PATENT DOCUMENTS

| 4,421,451 | A | 12/1983 | Higgins |
| 4,989,652 | A | 2/1991 | Hansson |
| 2008/0124229 | A1 | 5/2008 | Beetz et al. |

FOREIGN PATENT DOCUMENTS

| EP | 2 074 881 A1 | 7/2009 |
| GB | 708537 A | 5/1954 |
| WO | 03/082725 A1 | 10/2003 |

OTHER PUBLICATIONS

International Search Report, dated Sep. 12, 2013, from corresponding PCT application.

Prior Art

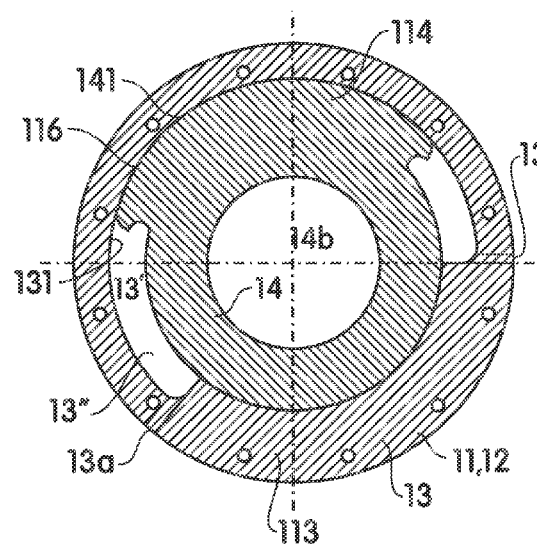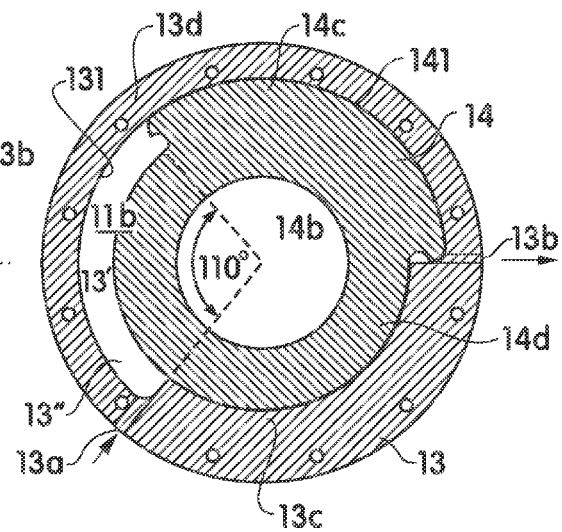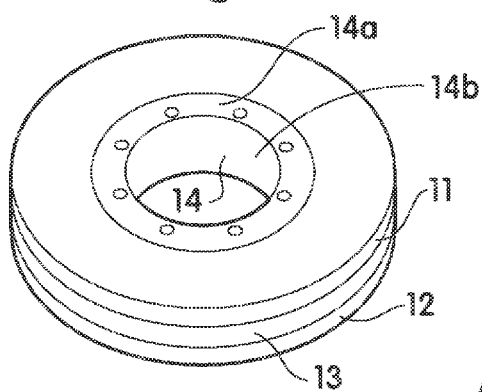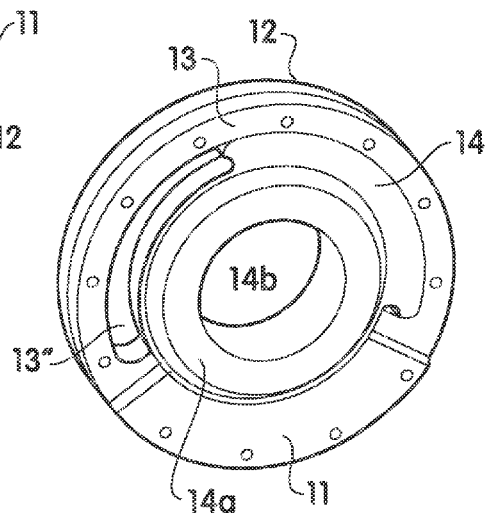

ARRANGEMENT FOR ACHIEVING A RECIPROCAL MOTION IN PARTICULAR FOR A CHAIN SAW

AREA OF TECHNOLOGY OF THE INVENTION

The current invention generally relates to a turnable arrangement which is turnable around an axis of rotation.

With its two parts, this type of arrangement can be driven, via an external energy source, in a rotating and/or reciprocal motion (a motor application) or can generate energy through a forced rotating and/or reciprocal motion (a generator application) by the arrangement's two parts.

In the following description, there will first be described an arrangement that is based on the principle of a motor application and a motor design, in order to turn the parts of the arrangement, a stator part or unit and a rotor part or unit, around an axis of rotation, relative to each other in an initial direction or in an opposite direction.

Examples of applications of the present invention will be shown below with reference to a hydraulically controlled arrangement, where this arrangement is designed and adapted to be included in a chain saw, as well as in a customised arrangement designed to provide a chain saw guide bar arrangement with a forward and backward swinging motion in order to carry out a crosscutting sequence for wood, timber, or the like, and more specifically, with reference to an arrangement for an adapted chain saw that provides a hydraulic action via a hydraulic control valve, wherewith the saw chain can be driven by a drive motor unit with a rotating shaft.

For such an arrangement, and for an application to chain saws, a first disc, which can be disposed to face a guide bar housing, must be fixed in relation to a first part, in the form of said housing, and a second disc, which can be disposed to face a drive motor unit, must be fixed in relation to a second part, in the form of said drive motor unit, wherewith the parts shall be able to be given a turning motion and therefore be turnable clockwise or counterclockwise around an axis of rotation for the arrangement in the form of a center axis for the rotatable shaft.

More specifically, the present invention has a turnable bearing arrangement, where the associated rotation can be allowed to be small and can in each case fall below a 360° rotation, however the preferred rotation is less than a half turn, for example only a quarter rotation (90°).

In the following, the invention will be further described in connection with an arrangement that can be turned by an assigned hydraulic pressure and flow, where this arrangement is related to a chain saw which is supported by a harvesting unit, adapted for a harvesting machine, for efficiently harvesting trees and the like and/or crosscutting timber, logs, and the like.

An arrangement described here will be provided for a chain saw as described, with a drive motor unit for the chain saw, fixed in relation to an associated chassis for the driving motor and/or harvesting unit in order to secure the guide bar and/or a guide bar arrangement, via a guide bar housing, with a driving sprocket for the saw chain.

More specifically, such an arrangement is adjusted to be able to provide the chain saw with an oscillatory (swinging) motion that is oriented in the plane of the chain saw guide bar, while performing a regular vertical crosscutting motion, whereby this oscillatory motion can be activated by a control device that is arranged peripherally to the chain saw but is physically coordinated with the chain saw.

Whilst the present invention is intended to be used with hydraulic oil or similar oils as a fluid, it should be noted that the invention's function can also be realised completely satisfactorily using another fluid, such as water or an aqueous emulsion.

In the following description, the fluid used will be a hydraulic oil of normal composition.

PRIOR ART

Various designs of an arrangement driven by an external energy source and/or an arrangement whose mechanical action will result in propagation of the energy generated, such as pumps for a fluid, are already known, in various forms.

It is well known that special consideration is required in terms of an arrangement, such as in a motor application, where the arrangement is driven by an external energy source and is given the form of a motor unit or comprises a bearing arrangement, with drivable parts between each other, and where the rotation around an axis of rotation is limited to a small radian measure (a small angle).

For bearing arrangements in general and a bearing arrangement in relation to a chain saw that is attached to a harvesting unit for a reciprocal motion or (swinging) oscillation pattern in particular, different designs are known which are able to provide such a chain saw and its guide bar arrangement with such reciprocal motion to cut trees and the like and/or perform crosscutting on timber, logs, and the like.

The present invention is based on using a hydraulic control or regulator valve, which will provide the bearing arrangement with a variable hydraulic pressure and flow, in order to be able to turn the bearing arrangement within its desired reciprocal motion.

Bearing arrangements that belong to this type and that are related to chain saws, which are supported by harvesting units for crosscutting of timber and the like, are well known within this area of technology, an example being the chain saw that is illustrated in the exploded view of FIG. 2, infra.

The arrangement illustrated here is arranged for said chain saw in a familiar fashion and is oriented between a guide bar housing unit and the chain saw's drive motor unit, in order to be able to provide the chain saw with an oscillatory (swinging) motion that is oriented in the plane of the guide bar, such as during a crosscutting operation, wherewith this oscillatory motion can be activated by a control device that is separate from the chain saw.

In this connection, it is already known that an oscillatory (swinging) motion for a chain saw can be obtained using a hydraulic piston-cylinder arrangement (not shown in FIG. 2), that acts via a coupling unit or a holder (shown in FIG. 2) to provide a forward and backward motion for the guide bar arrangement and within the plane of the guide bar.

One alternative to this arrangement has also been suggested that involves attaching a circular gear wheel to a bearing arrangement that is designed as a ball bearing, which, with the help of a gear rack that moves back and forth, will be able to provide the necessary oscillatory (swinging) motion for the bearing arrangement and guide bar.

In terms of significant features that are associated with the present invention, there is already a bearing arrangement that is known and on the market, although used in other areas of technology, that uses primarily hydraulics and more specifically hydrostatics, for a slow turning motion, where the static pressure of the hydraulic oil is forced in between opposing sliding and bearing surfaces, so that during an initial, relative displacement of the sliding or bearing surfaces, a thin film of oil appears that is designed to separate the sliding surfaces or bearing surfaces from each other (therefore without mechanical contact).

There is also another bearing arrangement that is known and on the market, however for other areas of technology, that uses hydraulics and more specifically hydrodynamics, primarily for a faster rotating motion, where the hydraulic oil is dropped or forced in between opposing sliding or bearing surfaces with the aid of a rotating motion, where the sliding and bearing surfaces will normally abut against each other during standstill, and an oil film will first be formed between the sliding or bearing surfaces as a rotating motion develops.

The present invention firstly involves an application with such a bearing arrangement that works with static pressure, due to the very limited reciprocal rotation that the invention requires, normally less than half a turn, and it will be able to provide a residual oil film between the sliding or bearing surfaces even under high axial pressure, high radial pressure and/or high bending and turning stresses.

The present invention thus proposes a means, based on a hydraulic bearing arrangement, which can be combined with a chain saw, and particularly a chain saw that is attached to a harvesting unit and its chassis for a reciprocal oscillatory (swinging) motion.

DESCRIPTION OF THE PRESENT INVENTION

Technical Problems

Considering the fact that the technical considerations that a person skilled in the art must go through to be able to offer a solution to one or more of the technical problems posed initially partly include the necessary insight into the actions and/or the sequence of actions to be taken, and partly the need to choose the necessary means, the below-described technical problems would consequently be relevant to arriving at the subject matter of the present invention.

In terms of the prior art, as described above, there is probably a technical problem in understanding the importance of the benefits associated with and/or the technical measures and considerations that will be required in the case of an arrangement which, via an external energy source, can drive the parts of the arrangement in a rotating (reciprocal) motion or which, via a supplied rotating (reciprocal) motion, can generate energy via the parts of the arrangement, and where the parts of the arrangement are made up of a stator part or unit and a rotor part or unit, where the stator part is comprised of a number of perforated discs, aligned and coordinated with each other and adjusted to surround a perforated rotor part, which rotor part is adjusted to pass through the holes in the discs, wherewith the discs of the arrangement are adjusted to cooperate with each other via hydraulic pressure, in particular, a hydrostatic pressure, in order to provide for low friction between the sliding or bearing surfaces of a given stator part during their displacement relative to each other, and thereby form partly a turnable arrangement capable of an arbitrary reciprocal or oscillating motion, and partly an application of this turnable arrangement for a chain saw, in order to be able to oscillate the guide bar while the saw chain is driven by a rotating shaft when running the saw chain with the saw chain's back and forth reciprocal motion between opposing end areas during crosscutting procedures.

A hydraulic pressure and flow which are provided should be able to operate a turnable arrangement related to a chain saw, which is supported by a harvesting unit, for, e.g., crosscutting of timber and the like, wherewith the bearing arrangement is arranged for said chain saw and oriented between a guide bar housing for the chain saw and a drive motor unit for the chain saw in order be able to provide the chain saw with an oscillatory (swinging) motion that is oriented in the plane of the guide bar, including when performing, e.g., a crosscutting motion, whereby this oscillatory motion can be activated by a hydraulic control valve, through which a hydraulic pressure and flow is controlled alternately via feed lines to said bearing arrangement, and should create the conditions to be able to entirely eliminate a previously used hydraulic piston-and-cylinder arrangement with a strong and robust mounting unit for the guide bar housing in order to swing the chain saw unit and the guide bar arrangement through the entire cutting motion, or alternately, to be able to avoid mounting and the presence of a gear wheel with an extended gear rack sticking out from the chain saw in order to turn the gear wheel.

There is a technical problem in understanding the importance of the benefits associated with and/or the technical measures and considerations that will be required in order to be able to significantly simplify the design of the arrangement and/or the bearing arrangement such that its oscillatory motion does not need to be affected by external parts and components, which have been shown to be demanding in terms of space and to be difficult in terms of handling the chain saw easily as it swings between its end positions; rather, the described action according to the invention can occur simply with the help of fixed hydraulic hoses that can be connected to a hydraulic control valve located on the periphery of the chain saw in order to generate reciprocal hydraulic flow related to the oscillatory (swinging) motion.

There is a technical problem in understanding the importance of benefits associated with and/or the technical measures and considerations that will be required in devising a turnable arrangement and/or bearing arrangement that can only be turned by a particular hydraulic pressure and flow provided, related to a chain saw that is supported by a harvesting unit, for example for crosscutting of timber and the like, wherewith the arrangement can be configured for a chain saw as described, and can be oriented between a guide bar housing for the chain saw and a drive motor unit, in order to provide an oscillatory (swinging) motion for the chain saw that is oriented in the plane of the guide bar while performing a crosscutting motion, whereby this oscillatory motion can be indirectly activated by the hydraulic control valve, through which a hydraulic flow is controlled reciprocally via feed lines to said arrangement; and further there is a technical problem in understanding that said arrangement should normally be activated via hydrostatic pressure and is coordinated on the one hand with the guide bar housing and on the other hand with the drive motor unit, via the discs in the arrangement that are oriented in parallel and aligned around the axis of rotation, and which can be turned in relation to each other, wherewith a centred and rotatable shaft should extend through said arrangement.

There is further a technical problem in understanding the importance of the benefits associated with and/or the technical measures and considerations that will be required in devising the described arrangement in each case with four discs that are oriented closely adjoining each other and arranged relative to each other around a common axis of rotation, where the first of these discs can be coordinated with a first part facing the guide bar, a second disc can be coordinated with a second part facing a drive motor, and with a third disc that can be oriented between said first and second discs, wherewith these discs are perforated and tightly united with each other in order to form a stator part or unit and they support an inner fourth disc forming a rotor part or rotor unit, centred around an axis of rotation.

There is still further a technical problem in understanding the importance of the benefits associated with and/or the technical measures and considerations that are required in surrounding the fourth disc or the arrangement's turnable part by said first, second, and third discs that are combined with each other.

There is further a technical problem in understanding the significance of the benefits associated with and/or the technical measures and considerations that will be required in forming a slot in said third (and fourth) disc, and the fact that this can be structured to provide a cavity that penetrates the third (and fourth) disc with access to the hydraulic fluid used, where the connections for hydraulic pressure and flow can be directly or indirectly connected to said cavity, and that said cavity can be provided with a radian measure, chosen to fall below $1.5\pi$ for a reciprocal movement within the length of the radian measure and between the opposing end parts, which corresponds to the arc that an angle corresponding to the radian measure cuts out of a circle with the midpoint in the axis of rotation or the turning axis, divided by the radius of the circle.

There is further a technical problem in understanding the importance of the benefits associated with and/or the technical measures and considerations that will be required in devising the specified connections to fit a control valve or valve unit that is external to the chain saw and that is intended to control an arrangement's externally generated pressure and flow, generated by an energy source that is external to the chain saw, in the form of a pump unit, in order to select a first operating mode that can be provided by setting of the valve unit.

There is further a technical problem in understanding the importance of the benefits associated with and/or the technical measures and considerations that will be required in devising the specified connections to fit a control valve or valve unit that is external to the chain saw and that is intended to control an arrangement's externally generated pressure and flow, generated by an energy source that is external to the chain saw, in order to select a second operating mode that can be provided by setting of the valve unit.

There is further yet a technical problem in understanding the importance of the benefits associated with and/or the technical measures and considerations that will be required in arriving at the pressure and flow generated in order to constantly provide, via the valve unit, an essentially static pressure between opposing radial-related and/or axial-related pressure absorbing sliding and bearing surfaces for the four coordinated discs.

There is further a technical problem in understanding the importance of the benefits associated with and/or the technical measures and considerations that will be required in devising the relationships between the first, second, and third disc in order to form a stator part or stator unit in order to surround the movable fourth disc, in order to form a rotor part or rotor unit, for example with a flange that can be attached to the guide bar housing.

There is still further a technical problem in understanding the importance of the benefits associated with and/or the technical measures and considerations that will be required in devising the relationships between the first disc, the second disc, and their respective parts, while the discs remain somewhat turnable with respect to each other.

There is further yet a technical problem in understanding the Importance of the so benefits associated with and/or the technical measures and considerations that will be required in providing the first disc and the second disc with flat surfaces that face each other and/or face away from each other, adjusted to limit to a certain extent the cavity that is formed within the third and/or fourth disc, which is formed by the slots that penetrate the disc.

There is further a technical problem in understanding the importance of the benefits associated with and/or the technical measures and considerations that will be required in devising the first disc and the second disc which are each shaped as a rotating body, with its own closed flat configuration, adjusted to connect to the same surface cross-section arranged for the first and/or second disc.

There is further a technical problem in understanding the importance of the benefits associated with and/or the technical measures and considerations that will be required in connecting said third and fourth discs to a part that is shaped as a rotating body (connecting to a stylized torus ring shape), each with its own closed flat configuration and adjusted to connect to a surface cross-section for the specified part, whilst an additional part of a rotating body with its own closed flat configuration is adjusted to connect to a surface cross-section for the additional part.

The Solution

The present invention can be considered to be based on an arrangement that can either drive the parts of the arrangement in a mutual turning or rotating motion via an external power source or that can generate energy by the rotating as well as reciprocal motion provided by the parts of the arrangement, where said parts of the arrangement consist of a stator part or stator unit and a rotor part or rotor unit, where the stator part is comprised of a number of perforated discs, coordinated with each other and adjusted to surround a perforated rotor part or unit, such as with a flange that is provided that is devised so as to be able to pass through a hole in one of the discs.

In this respect, the present invention provides that the discs of the arrangement should be adjusted to interact with each other via an oil film, generated primarily by hydrostatic pressure in order to provide for low friction between the sliding or bearing surfaces of the rotor part and the stator part, especially during their initial relative displacement.

The present invention is based on the known technology described in the introduction, wherewith a turnable bearing arrangement that is adjusted to and works with a hydrostatic pressure is included in a chain saw unit related to a harvesting unit, in order to provide the chain saw and its chain saw arrangement with a reciprocal oscillatory (swinging) motion while driving the saw chain along the chain guide bar.

In order to solve one or more of the technical problems specified above, the present invention proposes more specifically that the known technology be complemented with the features that are set forth in the predicate of claim 1.

Benefits (Advantages)

The benefits that can primarily be considered characteristic of the present invention and the particularly significant characteristics specified are that conditions have thereby been created such that an arrangement and/or a turnable bearing arrangement adjusted for hydraulics, in each case with three discs that are oriented next to each other and coordinated relative to each other around a common turning axis or axis of rotation, where a first disc can be coordinated with a first part that faces the guide bar housing and a second disc can be coordinated with a second part that faces the drive motor unit and with a third disc that is oriented between said first and second discs, with the design features according to which said first and second discs are shaped with flat surfaces that face each other, where these surfaces are adjusted in order to coordinate with the partially circular-shaped slot in said third disc, where the slot in said third disc has a cavity that penetrates the third and/or fourth disc to receive used and reciprocally supplied fluid, where the connections adjusted for hydraulic pressure and flow can be directly or indirectly connected to said cavity in order to turn a rotor part disposed within a stator part.

Said cavity can be assigned a radian measure, chosen to fall below $1.5\pi$ for a reciprocal movement for the rotor part in relation to the stator part within the length of the radian measure and between the opposing ends, corresponding to the arc that an angle corresponding to the radian measure cuts out from a circle with the center in the axis of rotation or turning axis, divided by the radius of the circle.

What primarily can be considered to be characteristic of the present invention is set forth in the predicate of claim 1.

BRIEF DESCRIPTION OF THE DRAWINGS

The prior art and presently suggested embodiments, showing the significant characteristics associated with the present invention, shall now be described in more detail for exemplary purposes with reference to the attached drawings, where:

FIG. 6 shows a radial cross-section of the third and fourth disc in a relative orientation, in a coordination between the two discs that is significant for the invention, and with specified connections to drive the fourth disc as a rotor part or unit relative to the stationary third disc as a stator part, wherewith these two discs assume a middle position between a selected starting position and a selected ending position.

FIG. 6 shows a radial cross-section according to FIG. 5 of the relative orientation of the third disc and the fourth disc in a coordination between the two discs that is significant for the invention and with the specified hydraulic connections to drive the fourth disc relative to the third disc to an end position or a starting position, depending on the relative direction of motion between the stator part and the rotor part that is desired, FIG. 7 shows the bearing arrangement according to FIG. 3 as a completely assembled unit in a perspective view, FIG. 8 shows the four parts of the bearing arrangement in complete coordination, and partly as a cross-section in order to clarify the design and coordination of the individual discs.

DESCRIPTION OF PRIOR ART ACCORDING TO FIGS. 1 AND 2

Figure 1:
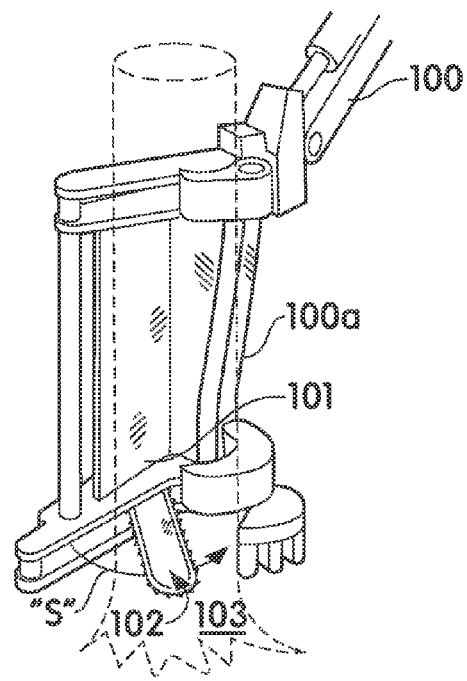
FIG. 1 shows a perspective schematic view of a harvesting unit with an applied chain saw unit with a guide bar arrangement that can be swung horizontally back and forth to produce a crosscutting motion according to FIG. 2 in the European patent publication EP 0 993 767 B1.
Figure 2:
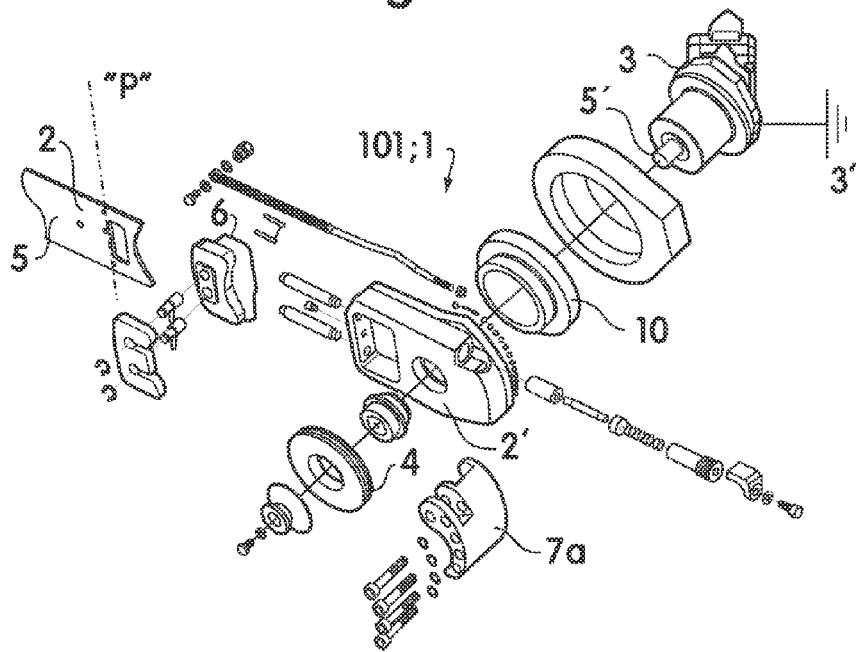
FIG. 2 shows a perspective exploded view of a known type of chain saw unit wherein there is a ball bearing between the drive motor unit and the guide bar arrangement, but where the means required for turning are removed for the sake of clarity.

FIG. 1 shows a copy of FIG. 2 in the European patent publication EP 0 993 767 B1 and illustrates, as an application of the present invention, a part of a harvesting unit 100, which with an outer part 100*a* is adjusted to support the chain saw arrangement 101 with its guide bar arrangement 102, and where the chain saw arrangement 101 can be adjusted to swing back and forth for a customised oscillatory crosscutting motion or track "S" for horizontally cutting a tree trunk 103 and returning to an original position.

FIG. 2 illustrates an exploded perspective view of a chain saw arrangement 101;1 with a known design and with the guide bar 5 and the guide bar arrangements, turned in relation to FIG. 1 for a vertical crosscutting motion.

FIG. 2 illustrates that this chain saw arrangement 101;1 can be equipped with a bearing arrangement 10, in the form of a ball bearing, mounted on one side to a drive motor unit 3 and to a guide bar housing 2' on the other side. A saw chain is attached to this housing 2' that extends around the guide bar, as is a gear wheel 4 for driving the saw chain. In addition, there is an arrangement 6 that holds and/or extends the inner end area of the guide bar 5.

The guide bar housing 2' interacts with a strong and robust mounting unit, in the form of a connecting or holding unit 7*a*, for a piston-cylinder arrangement that is not shown, to give the housing 2' a turning action around an axis of rotation 5' in a plane "P", This turning action around the axis of rotation 5' generates the necessary oscillatory motion "S" and will be executed using the piston-cylinder arrangement that is not shown and whose free end interacts with the connection unit 7*a* attached to the chain saw's motor chassis 3' in order to swing the guide bar arrangement 2 around the specified axis 5' for the drive unit 3, which is shown here mounted to the chassis 3'.

Said bearing arrangement (10) has alternately been suggested to consist of a circular gear wheel, and which using a outward facing gear rack, not-shown, will be able to turn the chain saw 1 around its axis of rotation 5' along the plane of the guide bar "P" and its swing path "S".

Description of Currently Proposed Embodiments

It should firstly be pointed out that in the following description of the currently proposed embodiment, which shows the significant characteristics associated with the invention, which are clarified in the subsequent drawings, we have chosen terms and special terminology in order to facilitate description of the inventive concept.

However, it should be noted in this respect that the expressions chosen should not be seen as limited only to this application and the chosen terms, rather it is understood that each such term shall be interpreted so that it covers all technical equivalents that function in the same or essentially the same way in order to be able to achieve the same or essentially the same purpose and/or technical effect.

In terms of the attached FIGS. 3 to 8, a schematic depiction, along with details, are shown of not just a first embodiment of the present invention, with only one cavity, comprising a bearing arrangement, but also these Figures serve to concretize the significant features associated with the invention through the embodiment that is currently proposed and that will subsequently be described in more detail.

FIGS. 9 to 13 illustrate alternative embodiments for the present invention, with two or three cavities. The invention's function can obviously also be performed with additional cavities that are oriented in a series around the inner periphery of the third disc.

Initially, an arrangement is described that can drive the parts of the arrangement either in a rotating motion using an external energy source or that can generate energy through a rotating or reciprocal motion supplied by the parts of the arrangement, the stator part and the rotor part.

Figure 4:
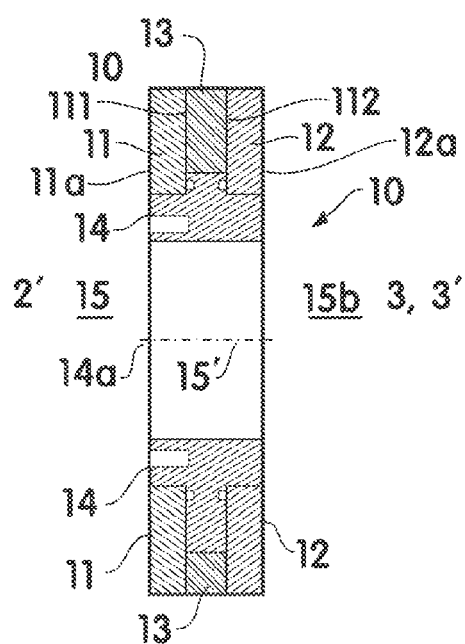
FIG. 4 shows a cross-section of a part of the bearing arrangement, according to FIG. 3, with its four interacting discs and with two, a first and a second, outer discs and a middle-oriented third disc that are integrated with each other to form a stator part and with an inner fourth disc that can be turned to coordinate with the others, in the form of a rotor part.

The parts of the arrangement are therefore made up of a stator part or unit coordinated via the discs with the reference numbers 11, 12, 13 and a rotor part or unit assigned the reference number 14 (FIG. 4). Each of the discs 11, 12 and 13 can consist of two or more discs, coordinated with each other, and disc 14 can consist of two or more discs coordinated with each other, in order to form the individual discs from a thinner material or to create a stronger bearing arrangement.

The stator part or unit is therefore constructed of a number of perforated discs, numbered 11, 12, 13 and these are coordinated with each other and adjusted to surround a perforated rotor part or unit 14, equipped with a flange, 14a in FIG. 7, adjusted to fit through a hole, in each case, in, in each case, one of the discs, namely disc 11.

The discs 11, 12, 13, 14 that are part of the arrangement are adjusted to interact with each other via hydrostatic pressure (and/or hydrodynamic pressure) in order firstly to create a constant low-level friction between the sliding surfaces or bearing surfaces of rotor part 14 and the stator parts 11, 12, 13.

The present invention recommends selecting a hydrostatic pressure, e.g., between 10 and 100 bar.

Figure 3:
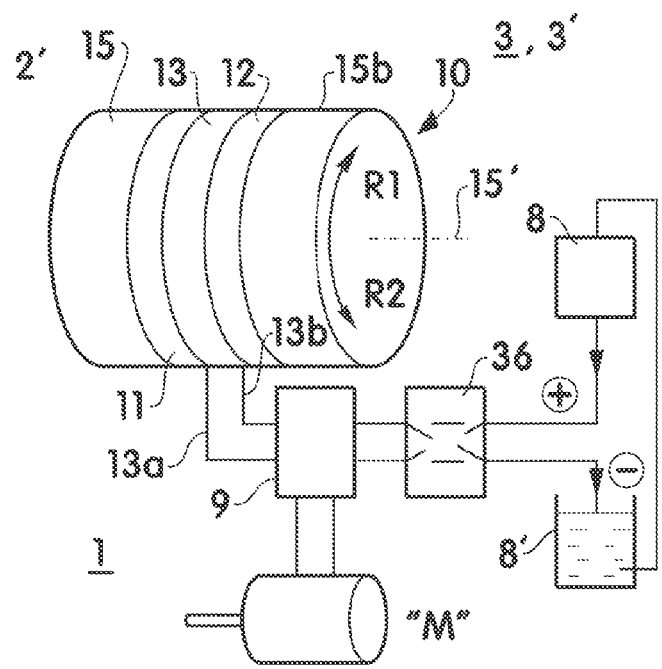
FIG. 3 shows a perspective view of the principle for a turnable first arrangement according to the present invention where three of four required discs are coordinated with each other to form a stator part, and where the third disc is designed to interact with an outside hydraulic control valve assuming one of two possible settings, and with a pump unit that is peripheral to the arrangement in order to drive the arrangement in short reciprocal, back and forth, motion as in a motor application.

The present invention is described with reference to the attached drawings, where FIG. 3 shows a perspective view of a number of discs 11, 12, 13 that are included in arrangement 10 as a stator part.

FIG. 4 shows a cross-sectional view of a fourth disc 14 that is included in the arrangement 10, according to FIG. 3, and FIGS. 5 to 8 show the coordination that is significant for the invention between the four discs or the parts and the specified hydraulic connections, numbered 13a, 13b, where one serves as a pressure connection (+) and one serves as return connection (−) in a first operating mode and in a second operating mode.

Based on FIGS. 3 to 8, the present invention in the form of a proposed bearing arrangement 10 according to a first embodiment will be described in more detail.

The present invention concerns a bearing arrangement 10, which can be turned around an axis of rotation 15' by an assigned hydraulic pressure and flow, and which can be related to a chain saw arrangement 1 which is supported by a harvesting unit 100 for repeated crosscutting of timber and the like.

The bearing arrangement 10 is arranged for said chain saw 1 and disposed between a guide bar housing 2' for the chain saw and a driving motor unit 3 for the chain saw 1, in order to drive the chain saw 1 in an oscillatory motion "S" (FIG. 1) in the plane "P" of the guide bar 5, while simultaneously performing a crosscutting motion in the plane "P" by driving of a driving shaft 5'.

According to the present invention, this oscillatory motion is activated by a hydraulic control valve 36, through which a hydraulic flow is controlled in one or another direction via feed lines 13a, 13b to said bearing arrangement 10 and its slot 13' forming a cavity 13".

More specifically, said bearing arrangement 10 is activated via a hydrostatic pressure where the bearing arrangement 10 on the one hand interacts with the guide bar housing 2' and on the other hand coordinates with the drive motor unit 3 and its mounting part to the chassis 3' via outer discs that are oriented in parallel and aligned around the axis of rotation 15' with central holes for the drive shaft, here numbered a first disc 11 and second disc 12.

Accordingly, the drive motor unit 3 has or interacts with a part 15b, that is fixed in relation to or is included in the drive motor unit 3, while the housing 2' has a fixed related part 15.

The discs 11, 12, 13 are perforated for the drive shaft 5' and solidly united with each other and surround a perforated disc 14, which creates the conditions for the chain saw 1 and the guide bar 5 to be turned in the desired direction around the axis of rotation 15'. The holes are adjusted to be able to accommodate a mounting part 3' for the drive motor unit 3, which means that the arrangement 10 will offer limited axial extension.

In this connection, the second disc 12 can be united with the drive motor unit 3, while the fourth disc 14 is united with the housing 2', in order to offer a small amount of relative movement between the first disc 11, the second disc 12, and the third disc 13, in relation to the turnable fourth disc 14.

The described coordination is based in each case on three discs 11, 12, 13 being oriented next to each other and aligned relative to each other around a common turning axis or axis of rotation 5', 15', where according to FIGS. 3 and 4, the first disc 11 can be coordinated with or constitute a first part 15 belonging to the housing 2', the second disc 12 can be coordinated with or constitute a second part 15b belonging to the drive motor unit 3, and with the third disc 13 can be oriented between said first disc 11 and said second disc 12.

Discs 11 and 12 and 13, as well as disc 14, are therefore aligned around the common axis of rotation 5', 15', which is significant for the invention, and which is coordinated with the oscillatory motion "S" illustrated in FIG. 1.

The fourth disc or part 14 is illustrated in FIG. 4 and is aligned with and surrounded by said first disc 11, second disc 12, and third disc 13, and has a center opening 5" for the drive shaft 5'.

An inner slot 13' (FIG. 6) formed in said third disc 13 has a cavity 13" that penetrates the third disc 13 for the hydraulic fluid being used and in order to enable the hydraulic pressure and flow connections 13a, 13b directly or indirectly to be connected to said cavity 13" and via valve 36 to pump unit 8.

According to the present invention, more specifically, the cavity 13" can be assigned a well balanced radian measure, wherewith here it is suggested that the selected radian measure fall below 1.5 7i, in order to create a reciprocal motion within the length of the radian measure, corresponding to the arc that an angle corresponding to the radian measure cuts out of a circle with a midpoint in the axis of rotation or turning axis, divided by the radius of the circle. FIG. 6 shows an angle of 110°.

In addition, it is suggested that the specified connections 13a, 13b in FIGS. 3, 5, and 6 be adjusted to fit the control valve 36, which is intended to control externally generated pressure and flow produced by an external pump unit 8 to select a first operating mode for the control valve 36 for turning in the direction "R1" indicated in FIG. 3.

The connections 13a, 13b are intended to control the externally generated pressure and flow, via the control valve 36, in order to select a second operating mode governed by control valve 36 for turning in the opposite direction "R2" indicated in FIG. 3.

A tank 8' is configured to be able receive excess oil and/or provide pump 8 with oil, depending on, among other things, the selected operating mode.

The generated pressure and flow are adjusted to create essentially static pressure between opposing radial-related and/or axial-related sliding or bearing surfaces, applicable to the sliding surfaces between the four discs.

The one disc 11 is, in FIG. 3, fixedly related to or integrated with the first part 15, the second disc is fixedly related to or integrated with the second part 15b, which in turn, as in the movement of a motor, can be assigned a reciprocal motion via an external energy source 8, or, as with a generator's movement, can be assigned a reciprocal motion by an internal energy source that can drive a motor via a switching device 9.

The first disc 11 and the second disc 12 have flat surfaces 11a, 12a that face away from each other and are adjusted in order to a certain extent be disposed adjoining a throughgoing slot 13' formed by a cavity 13" within the third disc 13. FIG. 6 shows a surface part 11b which will form a wall part for slot 13' and cavity 13".

The first disc 11 and the second disc 12 are each shaped like a rotating body, each with its own closed flat configuration that is adjusted to connect to a surface cross-section configured for the first 11 and second 12 disc and with a central hole 14b for the drive shaft 5' of the drive motor unit 3.

The described discs 13 and 14 are each shaped like a rotating body for part 13c (formed as a stylized torus shape), each with its own closed flat configuration that is adjusted to a surface cross-section arranged for the specified part 13c, whilst an additional part 13d of a rotating body with a closed flat configuration is adjusted to connect to a surface cross-section arranged for the additional part 13d, which is clarified in FIG. 6. In the same way, the disc 14 is formed with a part 14c and a part 14d.

By using valve 36 to fill and empty the cavity 13", which is formed between the inner surface of disc 13 and the outer surface of disc 14, and to provide an oil film between the opposing sliding or bearing surfaces 131, 141 of the first disc 11, the second disc 12, the third disc 13, and the fourth disc 14, an almost friction-free reciprocal motion is achieved between the arrangement's 10 movable parts, the stator part, and the rotor part.

FIGS. 9 to 13 illustrate additional embodiments for the arrangement according to the present invention with two or three cavities oriented in a series.

Figure 9:
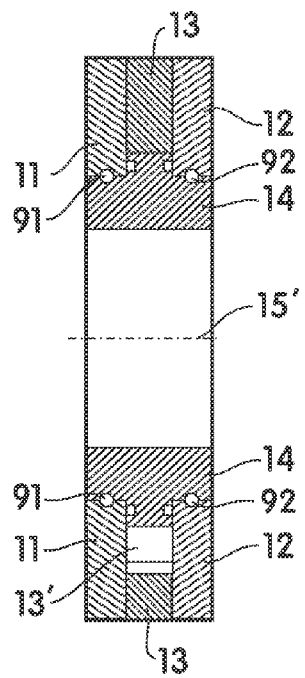
FIG. 9 shows a cross section, corresponding to FIG. 4, and shows a second arrangement designed for high axial and radial compressive stresses with more sporadically occurring bending stresses, where the radial forces are primarily absorbed by parallel rows of ball bearings placed in relation to the edge, which are oriented as two ball bearing arrangements.
Figure 10:
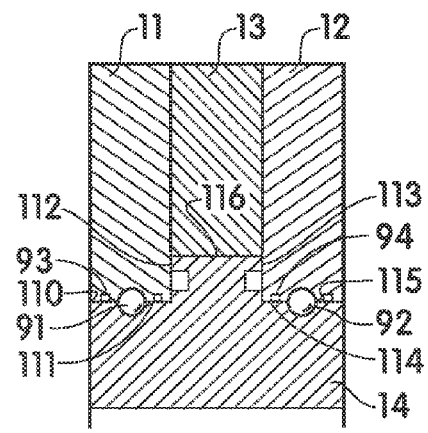
FIG. 10 shows a clearer representation of the cooperation between the sliding and bearing surfaces, according to FIG. 9, on a somewhat larger scale.

FIGS. 9 and 10 illustrate an embodiment for absorbing high radial compressive forces, which can be absorbed by a number of edge-related ball bearings 91, 92, each of which is surrounded by a pair of seals 93, 94 for the oil.

Figure 11:
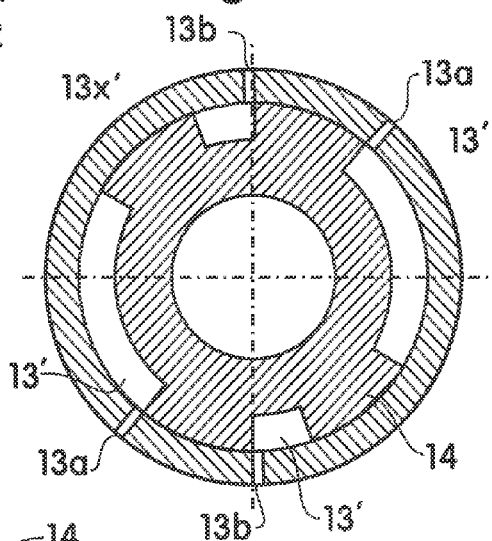
FIG. 11 shows a third arrangement with two peripheral cavities in order to limit (halve) the compressive stresses that are required for the arrangement's relative turning motion.
Figure 12:
FIG. 12 shows a side view of the third arrangement in FIG. 11.
Figure 13:
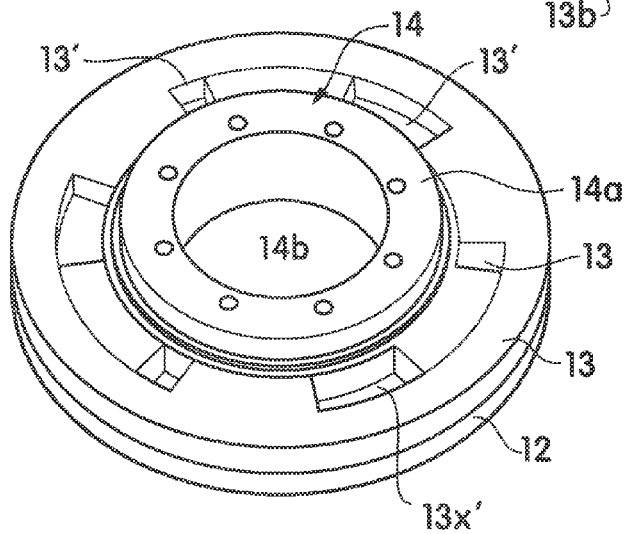
FIG. 13 shows a fourth arrangement with three peripheral cavities, in a perspective view, in order to limit (⅓) the compressive stresses that are required for the arrangement's relative turning motion.

FIGS. 11 and 12 illustrate an arrangement with two parallelly acting slots or cavities 13' and 13x', whilst FIG. 13 displays a perspective view of an arrangement with three slots or cavities, where two have been assigned the numbers 3' and (13').

With a plurality of slots and/or cavities 13', it is possible to reduce the pressure required to rotationally displace discs 11, 12 and 13, relative to disc 14.

An arrangement for sending the fluid to two or more slots 13', (13') is required in order to simultaneously maximize the effect.

The sliding surfaces that are to be provided with, or have been provided with, an oil film have been exemplified in FIG. 10 with the assigned reference numbers 110, 111, 112, 113, 114, 115 and 116.

The invention is obviously not limited to the embodiments illustrated given in the examples above, rather it is susceptible of modifications within the scope of the inventive concept set forth in the following patent claims.

In particular, it should be noted that each unit and/or circuit displayed can be combined with every other unit and/or circuit displayed in terms of being able to achieve the desired technical function.

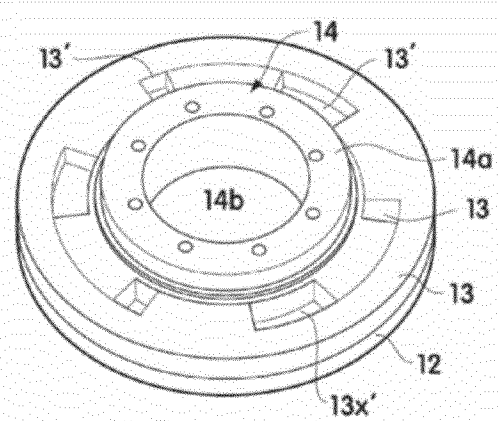

The invention claimed is:

1. An arrangement that is turnable around an axis of rotation (15'), arranged to achieve a reciprocal oscillatory motion ("S") of a guide bar (5) in a chain saw arrangement (1), which chain saw arrangement (1) is supported by a harvester unit (100) for cutting of timber (103), which oscillatory motion ("S") is performed in a plane ("P") of the guide bar, the arrangement comprising:
  a bearing arrangement (10);
  two shaft parts, the two shaft parts being arranged to interact axially and are, via the bearing arrangement (10), connected and rotatably arranged, about said axis of rotation (15'), in relation to each other,
  the two shaft parts comprising a stator part and a rotor part arranged as i) an outer stator part and an inner rotor part or ii) an inner stator part and an outer rotor part;
  a pump unit (8) that, using an imparted hydraulic pressure, turns the rotor part in relation to the stator part and thereby turns the guide bar (5);
  wherein the stator part is arranged to engage with the rotor part,
  wherein the stator part comprises two outer discs (11, 12) and an intermediate disc (13),
  wherein the rotor part comprises a disc (14) axially arranged between the two outer discs (11, 12) and arranged to cooperate with the intermediate disc (13), wherein the two out discs (11, 12), the intermediate disc (13), and the disc (14) of the rotor part are arranged in parallel and centered about the said axis of rotation (15'), wherein the two out discs (11, 12), the intermediate disc (13), and the disc (14) of the rotor part are arranged so that the intermediate disc (13) and the disc (14) of the rotor part together form at least one cavity (13") between the two outer discs (11, 12), wherein the pump unit (8) is arranged to impart the hydraulic pressure in said cavity (13") so that the disc (14) of the rotor is thereby turned in relation to the intermediate disc (13), such that hydraulic fluid is then allowed to penetrate between common sliding or bearing surfaces (110-116, 131, 141) between the stator part and the rotor part.

2. The arrangement of claim 1, further comprising:
a hydraulic control valve (36) that controls a flow of the hydraulic fluid via connections (13a, 13b) to the arrangement, and wherein,
the rotor includes a flange,
the two outer discs (11, 12) and the intermediate disc (13) of the stator are provided with respective through holes that accommodate the flange of the rotor, and achieve a rotary engagement between the stator and the rotor, and
said oscillatory motion is activated using the hydraulic control valve (36), through which the flow of the hydraulic fluid is controlled via the connections (13a, 13b) to said arrangement.

3. The arrangement according to claim 1, wherein the disc (14) of the rotor is enclosed by the two outer discs (11, 12) and the intermediate disc (13) of the stator.

4. The arrangement according to claim 1, wherein said cavity (13") allows a rotary movement of the disc (14) of the rotor relative to the intermediate disc (13) across an annular interval of maximally 1.5π radians.

5. The arrangement according to claim 1, wherein the hydraulic pressure is a static pressure.

6. The arrangement according to claim 1, further comprising a guide bar housing (2'), and wherein a first disc (11) of the two outer discs (11, 12) is fixedly related to or integrated with the guide bar housing (2').

7. The arrangement according to claim 6, further comprising a chassis (3'), and wherein a second disc (12) of the two outer discs (11, 12) is fixedly related to or integrated with the chassis (3').

8. The arrangement according to claim 7, wherein the first disc (11) and the second disc (12) have planar surfaces, facing each other, constituting limiting surfaces in said cavity (13").

9. The arrangement of claim 1, further comprising:
a hydraulic control valve (36) that controls a flow of the hydraulic fluid via connections (13a, 13b) to the arrangement,
wherein said oscillatory motion is activated using the hydraulic control valve (36), through which the flow of the hydraulic fluid is controlled via the connections (13a, 13b) to said arrangement.

10. The arrangement according to claim 2, wherein the disc (14) of the rotor is enclosed by the two outer discs (11, 12) and the intermediate disc (13) of the stator.

11. The arrangement according to claim 9, wherein the disc (14) of the rotor is enclosed by the two outer discs (11, 12) and the intermediate disc (13) of the stator.

12. The arrangement according to claim 2, wherein said cavity (13") allows a rotary movement across an annular interval of maximally 1.5π radians.

13. The arrangement according to claim 3, wherein said cavity (13") allows a rotary movement across an annular interval of maximally 1.5π radians.

14. The arrangement according to claim 1, wherein the two outer discs (11, 12) have planar surfaces, facing each other, constituting limiting surfaces in said cavity (13").

15. The arrangement according to claim 1, wherein the intermediate disc (13) and the disc (14) of the rotor part together form two of said cavity (13").

16. The arrangement of claim 1, wherein the two outer discs (11, 12) and the intermediate disc (13) of the stator are provided with respective through holes that accommodate the flange of the rotor, and achieve a rotary engagement between the stator and the rotor.

17. A combination of the arrangement of claim 1 and the harvester unit (100) for cutting of timber (103), the harvester unit (100) for cutting of timber (103) supporting the chain saw arrangement (1) having the guide bar (5).

18. The combination of claim 17, wherein said cavity (13") allows a rotary movement of the disc (14) of the rotor relative to the intermediate disc (13) across an annular interval of maximally 1.5π radians.

19. The combination of claim 17, wherein, the arrangement further comprises:
a hydraulic control valve (36) that controls a flow of the hydraulic fluid,
a guide bar housing (2'), where a first disc (11) of the two outer discs (11, 12) is fixedly with the guide bar housing (2'), and
a chassis (3'), where a second disc (12) of the two outer discs (11, 12) is fixedly with the chassis (3'), and wherein,
the rotor includes a flange,
the two outer discs (11, 12) and the intermediate disc (13) of the stator are provided with respective through holes accommodating the flange of the rotor, and providing a rotary engagement between the stator and the rotor, and
said oscillatory motion is activated using the hydraulic control valve (36), through which the flow of the hydraulic fluid is controlled,
wherein the disc (14) of the rotor is enclosed by the two outer discs (11, 12) and the intermediate disc (13) of the stator,
wherein the first disc (11) and the second disc (12) have planar surfaces, facing each other, constituting limiting surfaces in said cavity (13"), and
said cavity (13") allows a rotary movement of the disc (14) of the rotor relative to the intermediate disc (13) across an annular interval of maximally 1.5π radians.

* * * * *

UNITED STATES PATENT AND TRADEMARK OFFICE
CERTIFICATE OF CORRECTION

PATENT NO. : 9,849,604 B2
APPLICATION NO. : 14/401961
DATED : December 26, 2017
INVENTOR(S) : Gunnar Kurt Falk Page 1 of 3

It is certified that error appears in the above-identified patent and that said Letters Patent is hereby corrected as shown below:

On the Title Page

Delete the title page and substitute therefore with the attached title page consisting of the corrected illustrative figure In the Drawings Please replace FIGS. 10, 11, 13 with FIGS. 10, 11, 13 as shown below:

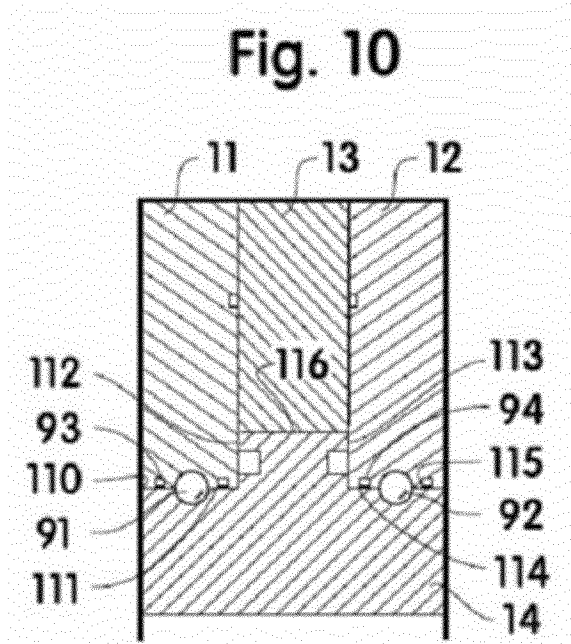

Figure 10 should be:

Signed and Sealed this
Thirteenth Day of August, 2019

Andrei Iancu
*Director of the United States Patent and Trademark Office*

CERTIFICATE OF CORRECTION (continued)
U.S. Pat. No. 9,849,604 B2

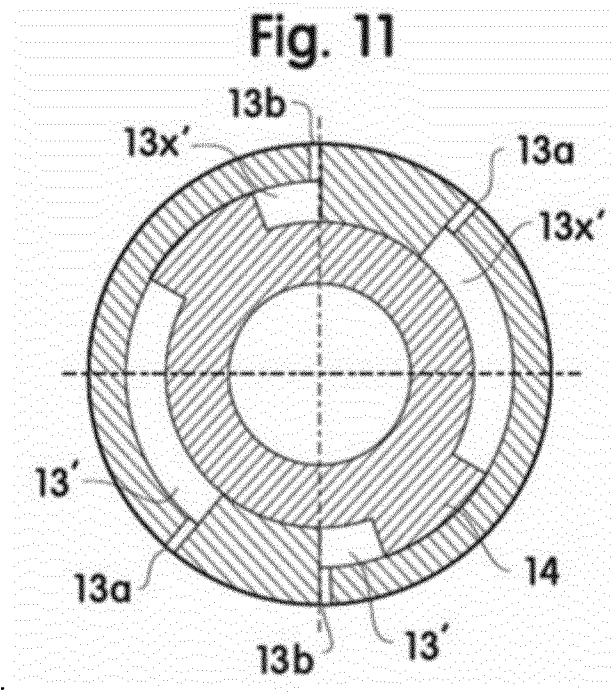

Figure 11 should be:

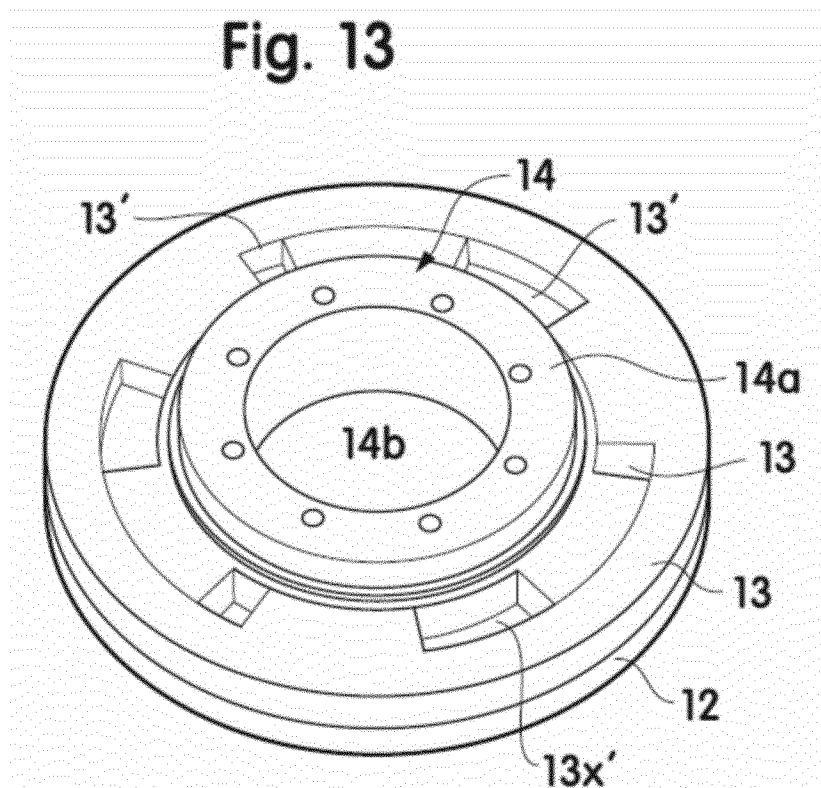

Figure 13 should be:

In the Specification

Column 12, Line 23 from "3' and (13')." should read "13' and 13x'."

(12) United States Patent
Falk

(10) Patent No.: US 9,849,604 B2
(45) Date of Patent: Dec. 26, 2017

(54) ARRANGEMENT FOR ACHIEVING A RECIPROCAL MOTION IN PARTICULAR FOR A CHAIN SAW

(71) Applicant: TURNSET AB, Färila (SE)

(72) Inventor: Gunnar Kurt Falk, Hudiksvall (SE)

(73) Assignee: TURNSET AB, Farila (SE)

(*) Notice: Subject to any disclaimer, the term of this patent is extended or adjusted under 35 U.S.C. 154(b) by 510 days.

(21) Appl. No.: 14/401,961

(22) PCT Filed: May 17, 2013

(86) PCT No.: PCT/SE2013/000081
§ 371 (c)(1),
(2) Date: Nov. 18, 2014

(87) PCT Pub. No.: WO2013/172761
PCT Pub. Date: Nov. 21, 2013

(65) Prior Publication Data
US 2015/0165639 A1 Jun. 18, 2015

(30) Foreign Application Priority Data
May 18, 2012 (SE) .......................... 1200343

(51) Int. Cl.
*A01G 23/091* (2006.01)
*B27B 17/08* (2006.01)
(Continued)

(52) U.S. Cl.
CPC ............ *B27B 17/08* (2013.01); *A01G 23/091* (2013.01); *F01C 9/002* (2013.01); *F01C 13/02* (2013.01);
(Continued)

(58) Field of Classification Search
CPC ..... A01G 23/08; A01G 23/083; A01G 23/091; B27B 17/08; B27B 17/083; B27B 17/086; B27B 17/10; B27B 17/12
(Continued)

(56) References Cited

U.S. PATENT DOCUMENTS 2,781,027 A 2/1957 Henry
3,696,713 A 10/1972 Ragard
(Continued)

FOREIGN PATENT DOCUMENTS

DE 197 25 412 A1 1/1999
EP 0 993 767 A2 4/2000
(Continued)

OTHER PUBLICATIONS

European Search Report, dated Apr. 25, 2016, from corresponding European Application No. 13790233.
(Continued)

*Primary Examiner* — Matthew G Katcoff
(74) *Attorney, Agent, or Firm* — Young & Thompson

(57) ABSTRACT

An arrangement that can be turned by an assigned hydraulic pressure and flow, related to a chain saw supported by a harvesting unit for crosscutting timber, wherein a bearing arrangement is arranged for the chain saw and oriented between a guide bar housing and the chain saw's drive motor unit, wherewith an oscillatory motion can be activated by a hydraulic control valve, through which hydraulic flow is alternatively controlled via feed or connection lines to the bearing arrangement, for a first or second operating mode. The arrangement is activated via hydrostatic pressure and coordinated with the guide bar housing, and with the drive motor unit, via surrounding perforated discs oriented in parallel and aligned around an axis of rotation for a drive shaft. The hydrostatic affects the arrangement's oscillatory (Continued)